United States Patent
Norum

(10) Patent No.: US 10,792,773 B2
(45) Date of Patent: Oct. 6, 2020

(54) ACTUATORS AND METHODS FOR CONTROLLING TOOLS

(71) Applicant: Esko-Graphics Kongsberg AS, Kongsberg (NO)

(72) Inventor: Viggo Lauritz Norum, Kongsberg (NO)

(73) Assignee: ESKO-GRAPHICS KONGSBERG AS, Kongsberg (NO)

( * ) Notice: Subject to any disclaimer, the term of this patent is extended or adjusted under 35 U.S.C. 154(b) by 0 days.

(21) Appl. No.: 16/336,270

(22) PCT Filed: Sep. 26, 2017

(86) PCT No.: PCT/EP2017/074339
§ 371 (c)(1),
(2) Date: Mar. 25, 2019

(87) PCT Pub. No.: WO2018/055196
PCT Pub. Date: Mar. 29, 2018

(65) Prior Publication Data
US 2019/0275622 A1    Sep. 12, 2019

Related U.S. Application Data

(60) Provisional application No. 62/399,573, filed on Sep. 26, 2016.

(51) Int. Cl.
*B23Q 1/44* (2006.01)
*B23Q 5/28* (2006.01)
(Continued)

(52) U.S. Cl.
CPC .............. *B23Q 1/44* (2013.01); *B23Q 5/28* (2013.01); *B23Q 5/326* (2013.01); *B23Q 5/36* (2013.01);
(Continued)

(58) Field of Classification Search
CPC ................................. B23Q 1/44; B23Q 5/326
(Continued)

(56) References Cited

U.S. PATENT DOCUMENTS 4,813,821 A * 3/1989 Hirota .................. B23G 1/20
318/39
4,879,660 A * 11/1989 Asakura ............ G05B 19/186
700/173
(Continued)

FOREIGN PATENT DOCUMENTS

| CH | 586583 A5 | 4/1977 |
| FR | 2821139 A1 | 8/2002 |

(Continued)

OTHER PUBLICATIONS

International Search Report and Written Opinion for International Application No. PCT/EP2017/074339, dated Jan. 19, 2018, 9 pages.

(Continued)

*Primary Examiner* — David Luo
(74) *Attorney, Agent, or Firm* — RatnerPrestia

(57) ABSTRACT

Actuators, systems, and methods for controlling tools are disclosed. One actuator includes a first motor, a second motor, and a controller. The first motor is operable to rotate a first threading extending in a first helical direction around an axis. The second motor is operable to rotate a second threading axially spaced apart from the first threading and extending in a second helical direction opposite the first helical direction around the axis. The controller is in communication with the first and second motors. The controller is configured to control speed and direction of the first and second motors to effect a desired pattern of axial and rotational movement of the tool. One method includes rotating the first threading in a first rotational direction, and simultaneously, rotating the second threading in a second rotational direction opposite the first direction.

20 Claims, 2 Drawing Sheets

(51) Int. Cl.
 *B23Q 5/32* (2006.01)
 *B23Q 5/36* (2006.01)
 *B23Q 5/40* (2006.01)
 *F16H 25/20* (2006.01)

(52) U.S. Cl.
 CPC ........ *B23Q 5/40* (2013.01); *F16H 2025/2059* (2013.01); *F16H 2025/2078* (2013.01)

(58) Field of Classification Search
 USPC .................................................... 318/34, 35
 See application file for complete search history.

(56) References Cited

U.S. PATENT DOCUMENTS

| | | | |
|---|---|---|---|
| 5,647,245 A | | 7/1997 | Takai |
| 6,111,382 A | * | 8/2000 | Tsutsui ................. G05B 19/186 318/569 |
| 7,007,566 B2 | | 3/2006 | Norum |
| 2017/0095897 A1 | | 4/2017 | Moraru et al. |

FOREIGN PATENT DOCUMENTS

| | | |
|---|---|---|
| WO | 8800507 A1 | 1/1988 |
| WO | 2015140334 A1 | 9/2015 |

OTHER PUBLICATIONS

European Communication for European Application No. 17783415.7, dated May 16, 2019—3 pages.
International Preliminary Report on Patentability for International Application No. PCT/EP2017/074339, dated Mar. 26, 2019—6 pages.

* cited by examiner

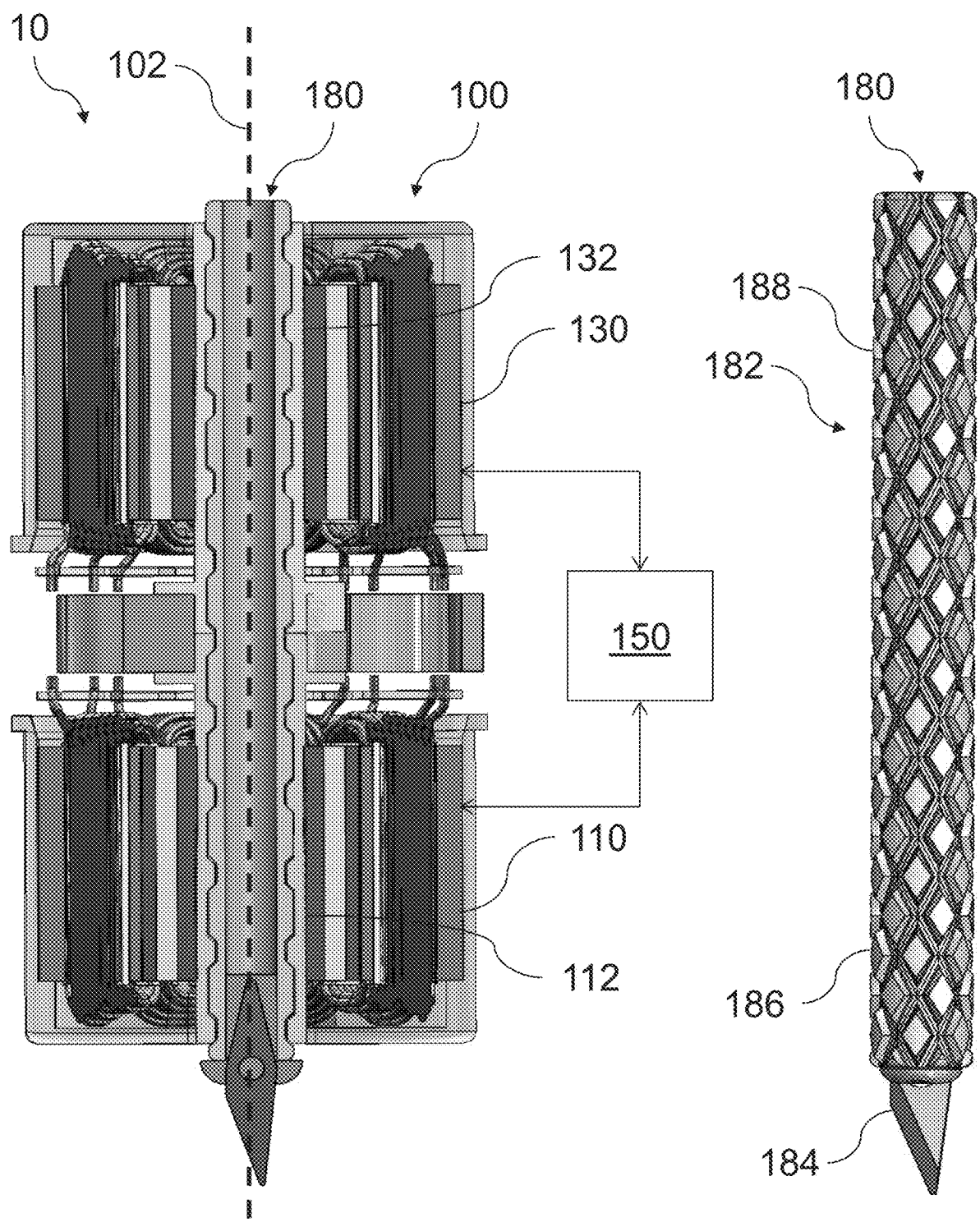

ACTUATORS AND METHODS FOR CONTROLLING TOOLS

CROSS REFERENCE TO RELATED APPLICATIONS

This application claims priority to U.S. Patent Application No. 62/399,573, entitled "ACTUATORS AND METHODS FOR CONTROLLING TOOLS," filed Sep. 26, 2016, the contents of which are incorporated herein by reference in their entirety.

FIELD OF THE INVENTION

The present invention relates generally to actuators, and more particularly, to actuators and methods for controlling tools, such as cutting tools.

BACKGROUND OF THE INVENTION

Cutting tables are used to efficiently and consistently cut workpieces formed from materials such as paper, fabric, textiles, wood, metal, for example. To achieve these goals of efficiency and consistency, the tools used for cutting the workpiece must be capable of being precisely controlled and rapidly moved. Improved devices and methods for controlling such cutting tools are generally desired.

SUMMARY OF THE INVENTION

Aspects of the present invention are directed to actuators, systems, and methods for controlling tools.

In accordance with one aspect of the present invention, an actuator for controlling a tool is disclosed. The actuator includes a first motor, a second motor, and a controller. The first motor is operable to rotate a first threading extending in a first helical direction around an axis. The second motor is operable to rotate a second threading axially spaced apart from the first threading and extending in a second helical direction opposite the first helical direction around the axis. The controller is in communication with the first and second motors. The controller is configured to control speed and direction of the first and second motors to effect a desired pattern of axial and rotational movement of the tool.

In accordance with another aspect of the present invention, a cutting system is disclosed. The cutting system includes a first motor, a second motor, a cutting tool, and a controller. The first motor is operable to rotate a first threading extending in a first helical direction around an axis. The second motor is operable to rotate a second threading axially spaced apart from the first threading and extending in a second helical direction opposite the first helical direction around the axis. The cutting tool includes a shaft having a first mating threading extending in the first helical direction configured to mate with the first threading, and a second mating threading extending in the second helical direction configured to mate with the second threading. The controller is in communication with the first and second motors. The controller is configured to control speed and direction of the first and second motors to effect a desired pattern of axial and rotational movement of the cutting tool.

In accordance with yet another aspect of the present invention, a method for controlling a tool is disclosed. The method includes a first pair of rotating steps. The first pair of rotating steps includes rotating a first threading in a first rotational direction, the first threading extending in a first helical direction around an axis, and simultaneously, rotating a second threading in a second rotational direction opposite the first direction, the second threading axially spaced apart from the first threading and extending in a second helical direction opposite the first helical direction around the axis.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 1 is a diagram illustrating an exemplary cutting system in accordance with aspects of the present invention;

FIG. 2 is a diagram illustrating a cutting tool of the exemplary cutting system of FIG. 1.

DETAILED DESCRIPTION OF EMBODIMENTS OF THE INVENTION

Figure 3:
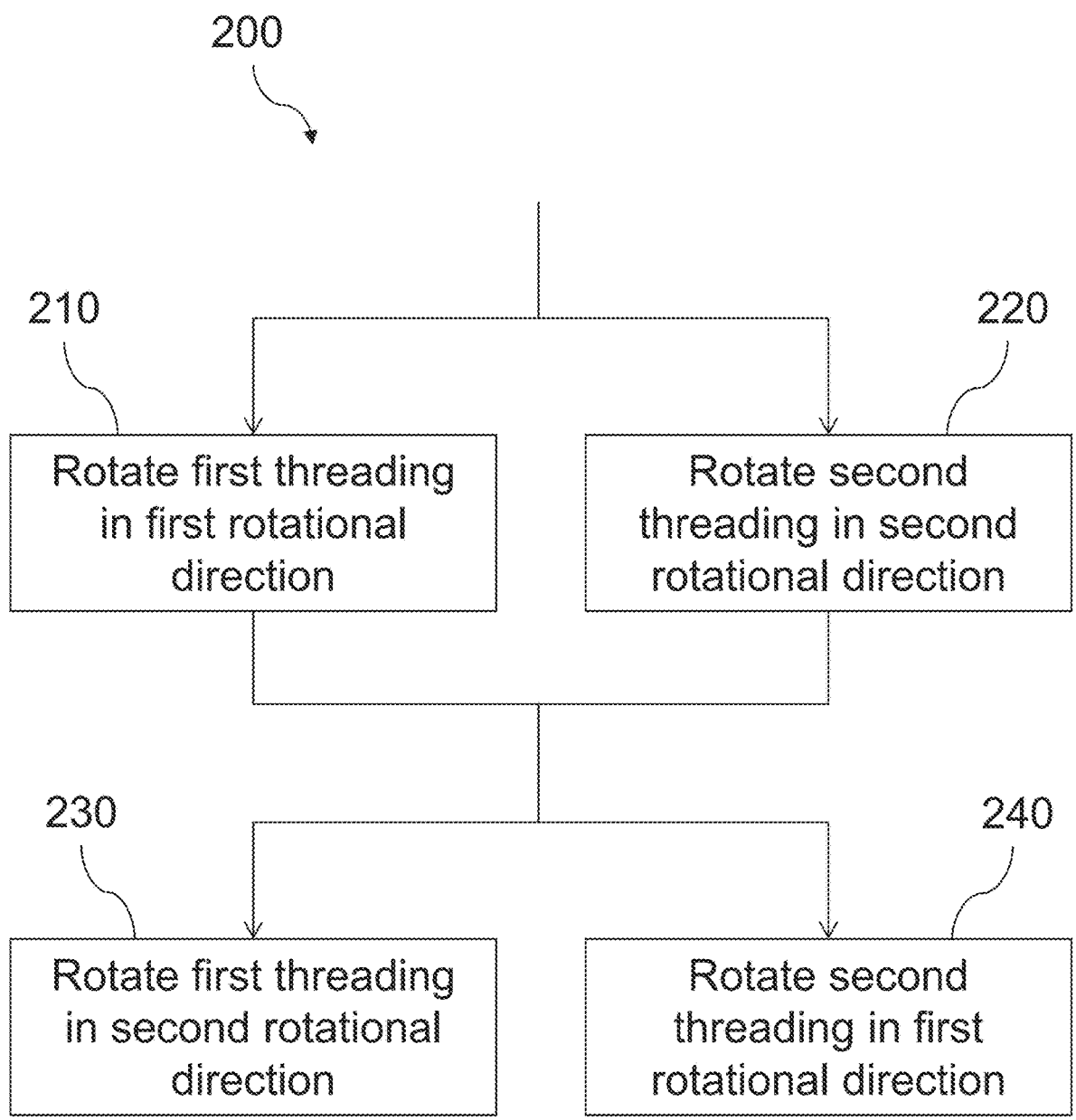
FIG. 3 is a flowchart illustrating an exemplary method for controlling a tool in accordance with aspects of the present invention.

The embodiments of the invention described herein are generally directed to the control of cutting tools. However, it will be understood by one of ordinary skill in the art that the invention is not so limited. To the contrary, the embodiments described herein may be used to control any number of alternative types of tools. Suitable tools will be known to those of ordinary skill in the art from the description herein.

With reference to the drawings, FIGS. 1 and 2 illustrate an exemplary cutting system 10 in accordance with aspects of the present invention. Cutting system 10 may be used in association with a cutting table in order to cut a workpiece.

Cutting system 10 includes an actuator 100 and a tool 180. Actuator 100 controls the position and movement of tool 180. In general, actuator 100 includes a pair of motors 110, 130 and a control 150. Additional details of actuator 100 are described below.

Motors 110, 130 generate movement of tool 180. In an exemplary embodiment, each motor 110, 130 is coupled to a respective threading 112, 132. Motor 110 is operable to rotate threading 112, and motor 130 is operable to rotate threading 132.

Threadings 112, 132 may be characterized as internal threadings (e.g., the grooves that define the threading extend inwardly) or external threadings (e.g., the ridges that protrude relative to the grooves). Threading 112 extends in a first helical direction around an axis 102. Threading 132 is axially spaced apart from threading 112 along axis 102. Threading 132 extends in a second, opposite helical direction around axis 102. In an exemplary embodiment, threadings 112, 132 are formed by a pair of nuts. Other suitable structures defining threadings 112, 132 will be known to one of ordinary skill in the art from the description herein.

Controller 150 communicates with motors 110, 130. Controller 150 is configured to control the speed and direction of motors 110, 130. This control of motors 110, 130 results in a corresponding control over the movements of threadings 112, 132. Accordingly, controller 150 controls motors 110, 130 in order to effect a desired pattern of axial and rotational movement of tool 180.

In an exemplary embodiment, controller 150 is coupled with a memory. The memory stores data representing a series of movements of tool 180 selected in order to perform a desired cut or series of cuts on a workpiece. Controller 150 controls motors 110, 130 in order to cause tool 180 to perform the series of movements stored in the memory.

In addition to or instead of controlling movement of tool 180, controller 150 may also control a movement of the workpiece using one or more other actuators (such as linear actuators, not shown) in order to move the workpiece in conjunction with the cutting movements of tool 180. Suitable structures for moving the workpiece of cutting system 10 will be known to one of ordinary skill in the art from the description herein.

Tool 180 is a cutting tool. Tool 180 comprises a shaft or handle 182 and a blade 184 provided on the axial end of shaft 182. Shaft 182 further includes threadings 186, 188 on the outer surface thereof. Threadings 186, 188 may be external threadings, (e.g., the diamond-shaped islands that define the threading extend outwardly from shaft 182) or internal threadings (e.g., the grooves that define the diamond-shaped islands extend inwardly into shaft 182). Threading 186 extends in one helical direction, and is configured to mate with threading 112. Threading 188 extends in an opposite helical question, and is configured to mate with threading 132. Threadings 186, 188 may overlap with one another, or may be axially spaced and separate from one another.

Specific operations of motors 110, 130 by controller 150 are set forth below. It will be understood by one of ordinary skill in the art that each of the operations or actions described below are provided as examples, and are not limiting of the present invention.

Controller 150 may be configured to move tool 180 in an axial direction. To perform such an action, controller 150 operates motor 110 to rotate threading 112 in a first rotational direction (e.g., clockwise), and simultaneously operates motor 130 to rotate threading 132 in a second, opposite rotational direction (e.g. counterclockwise) at the same rate. This rotation of threading 112 imparts a downward force on threading 186 of tool 180, and this rotation of threading 132 imparts a downward force on threading 188 of tool 180. As a result, tool 180 is moved in an axially downward direction.

Subsequently, controller 150 operates motor 110 to rotate threading 112 in the second rotational direction, and simultaneously operates motor 130 to rotate threading 132 in the first rotational direction at the same rate. This rotation of threading 112 imparts an upward force on threading 186 of tool 180, and this rotation of threading 132 imparts an upward force on threading 188 of tool 180. As a result, tool 180 is moved in an axially upward direction.

An optimal cutting motion may require the above-described upward and/or downward motions to cover a particular stroke length. In an exemplary embodiment, controller 150 controls tool 180 to move with a stroke length up to 8 mm, and preferably, from 0.3 to 1.2 mm.

An optimal cutting motion may also involve periodically repeating the above-described upward and downward motions of cutting tool 180. Accordingly, in an exemplary embodiment controller 150 may be configured to pulse the above-described operations of motors 110, 130.

For example, controller 150 may pulse the operation of motors 110, 130 in an alternating pattern between the first and second rotational directions. Controller 150 may first simultaneously operate motors 110, 130 to produce the downward motion of tool 180 for a period of time, and then simultaneously operate motors 110, 130 to produce the upward motion of tool 180 for a period of time. This back and forth (or up and down) movement of tool 180 creates a sawing motion of the blade 184 of tool 180.

The above-described sawing motion may further be performed at a desired frequency. In an exemplary embodiment, controller 150 operates motors 110, 130 to move tool 180 up and down at a frequency of 100 Hz or more, and preferably at a frequency of 300 Hz or more. Such frequencies require performing the above-described pairs of rotations for a duration of 10 ms or less, and preferably 3.3 ms or less.

Controller 150 may be alternatively be configured to rotate tool 180 (i.e. move tool 180 in a rotational direction). To perform such an action, controller 150 operates motor 110 to rotate threading 112 in a rotational direction, and operates motor 130 to rotate threading 132 in the same rotational direction. This rotation of threading 112 and threading 132 in the same direction imparts a rotational force on threading 186 and threading 188 of tool 180. As a result, tool 180 is rotated.

The axial sawing motion described above that is created by cycling between rotating threading 112 and 132 in a pair of opposite directions at the same rate and then reversing directions is operable to move tool 180 in an upward or downward direction relative to a particular axial base point, which may be disposed, for example, on or spaced axially from the plane of a work piece. As long as the threading 112 and 132 rotate at the same speed in each portion of the up or down motion, the speed in one portion of the cycle need not be the same as the speed in another portion of the cycle. For example, it may be desirable to impart a first rotational speed on a downstroke and a second rotational speed on the upstroke, which can be effected by adopting different rotational speeds for each portion of the cycle. The respective speeds over the course of each stroke may conform to any type of curve, such as a square wave, sine wave, sawtooth wave, or some combination thereof, which curve may be different between the up and down portions of the strokes. Thus, the rotational speeds may be relatively faster in one portion of the stroke as compared to another, or may be nearly the same over the course of the majority of each stroke. In general, because of the need to reverse direction at the beginning and end of each up or down portion of the stroke, the speed will generally be slower at the beginning or end than in the middle of the up or down portion of the stroke, to minimize wear and tear on the tool and/or motors, and thus a sinusoidal wave may be more desirable than a square wave. To axially move the axial base point upward or downward toward or away from the work piece, such as from a resting position to a non-resting position, or to accommodate non-planer work pieces, controller 150 may be configured to rotate threading 112 and 132 at different rotational rates. While the axial and rotational movements of tool 180 are described separately above, it will be understood that the invention is not so limited. To the contrary, axial and rotational movements of tool 180 may be combined into one helical (axial+rotational) movement, for example, by rotating threading 112 in one rotational direction at one rate, and by rotating threading 132 in an opposite rotation direction and/or at a different rate. The amount of axial or rotational movement in the helical movement is dependent on the difference in speed and/or direction in the rotation of threadings 112 and 132.

When a cutting operation is complete, controller 150 may be operable to withdraw tool 180 from the workpiece, e.g., by axially moving tool 180 in an upward direction to a rest position. In this example, actuator 100 may further include a sheath. Controller 150 may operate motors 110, 130 to withdraw tool 180 such that blade 184 is positioned within the sheath when a cutting operation is not being performed.

FIG. 3 illustrates an exemplary method 200 for controlling a tool in accordance with aspects of the present invention. Method 200 may be usable by a cutting system to cut a workpiece. In general, method 200 includes a pair of rotating steps. Additional details of method 200 are described below with respect to the components of cutting system 10.

In step 210, a first threading is rotated in a first rotational direction. In an exemplary embodiment, controller 150 operates motor 110 to rotate threading 112 in a first rotational direction (e.g., clockwise).

In step 220, a second threading is rotated in a second, opposite rotational direction. In an exemplary embodiment, controller 150 operates motor 130 to rotate threading 132 in a second, opposite rotational direction (e.g., counterclockwise).

Step 220 is performed simultaneously with step 210. In order to perform a desired sawing motion, it may be desirable to perform steps 210 and 220 for a predetermined period of time, for example, 10 ms or less.

It will be understood by one of ordinary skill in the art that method 200 is not limited to the above-described steps, but may include alternative or additional components as would be understood to one of ordinary skill in the art.

For example, method 200 may include another pair of rotating steps performed immediately following the first pair of rotating steps. This second pair of rotating steps includes rotating the first threading in the second rotational direction (step 230), and simultaneously, rotating the second threading in the first rotational direction (step 240). It may be desirable to perform this second pair of rotating steps for a predetermined period of time, which may be the same or a different period of time as the time of the first pair of rotating steps.

For another example, method 200 may include engaging a cutting tool with the first and second threadings before any rotation is performed. In an exemplary embodiment, threading 186 of tool 180 is engaged with threading 112, and threading 188 of tool 180 is engaged with threading 132.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A cutting system comprising:
a first motor operable to rotate a first threading extending in a first helical direction around an axis;
a second motor operable to rotate a second threading axially spaced apart from the first threading and extending in a second helical direction opposite the first helical direction around the axis;
a cutting tool comprising a shaft having a first mating threading extending in the first helical direction configured to mate with the first threading, and a second mating threading extending in the second helical direction configured to mate with the second threading; and
a controller in communication with actuators for the first and second motors and linear actuators for controlling position of a workpiece relative to the cutting tool, and
a memory coupled to the controller and configured to store data representing a series of movements of the cutting tool corresponding to a desired cut or series of cuts on the workpiece, the controller configured to control speed and direction of the first and second motors to effect a desired pattern of axial and rotational movement of the cutting tool while controlling movement of the workpiece relative to the cutting tool, including:
a) moving the cutting tool in the first and second opposite axial directions, including withdrawing and advancing the tool to or from a resting location, to or from an axial base cutting location, or axially shifting the axial base cutting location;
b) rotating the cutting tool; and
c) creating a sawing motion of the tool, including while at the axial base location, while rotating the tool, or while axially shifting the axial base location.

2. The system of claim 1, wherein operation of the first motor to rotate the first threading in a first rotational direction and operation of the second motor to rotate the second threading in a second rotational direction opposite the first rotational direction causes the cutting tool to move in a first axial direction, and operation of the first motor in the second rotational direction and the second motor in the first rotational direction cause the cutting tool to move in a second axial direction opposite the first axial direction, and the controller is configured to pulse the operation of the first and second motors in a alternating pattern between the first and second rotational directions to cause the cutting tool to move back and forth in the first and second axial directions to create the sawing motion of the cutting tool having a stroke length selected from a range of stroke lengths and a frequency selected from a range of frequencies.

3. The system of claim 2, wherein the controller is configured to rotate the first and second motors at a same rotational speed as one another in each portion of the alternating pattern corresponding to each axial direction to create the sawing motion centered about an axial base location, and to rotate the first and second motors at a different rotational speed in one portion of the alternating pattern than in another portion of the alternating pattern in order to withdraw or advance the tool from a resting location to or from the axial base location or to otherwise axially shift the axial base location.

4. The system of claim 2, wherein the range of frequencies includes a range of 100 Hertz or more.

5. The system of claim 4, wherein the selected frequency is at least 300 Hz.

6. The system of claim 2, wherein the range of stroke lengths includes a range of 0.1 to 8 mm.

7. The system of claim 2, wherein the selected stroke length is within a range of 0.3 to 1.2 mm.

8. The system of claim 1, wherein the controller is configured to operate the first motor to rotate the first threading in a rotational direction at a rotational speed and the second motor to rotate the second threading in the same rotational direction in order to rotate the cutting tool.

9. The system of claim 1, wherein the cutting tool comprises a blade on an axial end of the shaft.

10. The system of claim 1, wherein the sawing motion has an up stroke and a down stroke, wherein the controller is configured to cause at least one portion of each up or down stroke to have a different velocity than another portion of each up or down stroke.

11. The system of claim 1, wherein the sawing motion has an up stroke and a down stroke and each combination of up stroke and down stroke comprises a cycle, and the controller is configured to cause the velocity of the cutting tool to conform to a curve over each cycle.

12. The system of claim 11, wherein the curve comprises a sinusoidal wave.

13. The system of claim 1, further comprising a sheath for housing the cutting tool, wherein the resting location comprises the cutting tool positioned within the sheath.

14. The system of claim 1, wherein the linear actuators for controlling relative position of the workpiece are configured to move the workpiece relative to a fixed position of the cutting tool.

15. The system of claim 1, wherein the linear actuators for controlling relative position of the workpiece are configured to move the cutting tool relative to a fixed position of the workpiece.

16. The system of claim 1, wherein the cutting tool comprises a blade at an axial end of the shaft.

17. The system of claim 16, wherein the blade has a pointed terminal end and a linear cutting edge extending from the pointed terminal end at an angle relative to the axis of the shaft such that a down stroke of the cutting tool relative to the workpiece cuts the workpiece laterally along a line perpendicular to the axis of the shaft.

18. The system of claim 17, wherein the blade is a knife blade.

19. The system of claim 18, wherein the knife blade has only a single cutting edge facing in a lateral direction relative to the axis of the shaft.

20. The system of claim 1, wherein the cutting system comprises a cutting table.

\* \* \* \* \*